United States Patent
Mouton et al.

(10) Patent No.: US 12,291,980 B2
(45) Date of Patent: May 6, 2025

(54) UNDUCTED RECTIFIER FOR A TURBOMACHINE, TURBOMACHINE MODULE AND AIRCRAFT TURBOMACHINE

(71) Applicant: SAFRAN AIRCRAFT ENGINES, Paris (FR)

(72) Inventors: Clémentine Charlotte Marie Mouton, Moissy-Cramayel (FR); Olivier Belmonte, Moissy-Cramayel (FR); Olivier Bazot, Moissy-Cramayel (FR); Clément Cottet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/569,353

(22) PCT Filed: Jun. 13, 2022

(86) PCT No.: PCT/FR2022/051113
§ 371 (c)(1),
(2) Date: Dec. 12, 2023

(87) PCT Pub. No.: WO2022/263752
PCT Pub. Date: Dec. 22, 2022

(65) Prior Publication Data
US 2024/0271541 A1    Aug. 15, 2024

(30) Foreign Application Priority Data

Jun. 15, 2021   (FR) .................................. FR2106330

(51) Int. Cl.
*F01D 9/04*       (2006.01)
*B64D 27/10*      (2006.01)
(Continued)

(52) U.S. Cl.
CPC ............ *F01D 9/041* (2013.01); *F01D 17/162* (2013.01); *F03B 3/126* (2013.01); *F04D 29/30* (2013.01);
(Continued)

(58) Field of Classification Search
CPC ........ F01D 9/041; F01D 17/162; F03B 3/126; F04D 29/30; F04D 29/305; F04D 29/563; B64D 27/10; F05D 2220/323
See application file for complete search history.

(56) References Cited

U.S. PATENT DOCUMENTS

| 2,215,609 A | 9/1940 | Gilbert |
| 4,065,077 A | 12/1977 | Brooks |

(Continued)

FOREIGN PATENT DOCUMENTS

| FR | 3082230 A1 * | 12/2019 | ............ B64C 11/32 |
| FR | 3087830 A1 | 5/2020 | |
| FR | 3087831 A1 | 5/2020 | |

OTHER PUBLICATIONS

"KVT_KEENSERTS_Thread_inserts_EN_Dec. 2015_web-catalog"; 2015. KVT Fastening. https://www.kvt-fastening.at/-/media/kvt/download-center/catalogs/kataloge_en/kvt_keenserts_thread_inserts_en_12-2015_web-catalog.pdf (Year: 2015).*

(Continued)

*Primary Examiner* — Brian Christopher Delrue
(74) *Attorney, Agent, or Firm* — CHRISTENSEN O'CONNOR JOHNSON KINDNESS PLLC

(57) ABSTRACT

An unducted rectifier for a turbomachine is provided. The rectifier includes: (1) stator vanes each having a root and a blade radially projecting from the root, the root having two half-platforms; (2) pivots, each associated with a vane mounted so as to pivot about a pitch axis and configured to connect to a system for changing the pitch of the blades, (Continued)

each pivot having an upper platform and a cylindrical lower portion; and (3) attachment systems for attaching the half-platforms of the root of the vane to the associated pivot, each having two plates having a substantially identical shape to each half-platform and a clamping system for clamping the half-platforms between the plates of the attachment system and the upper platform of the pivot.

13 Claims, 5 Drawing Sheets

(51) Int. Cl.
  *F01D 17/16* (2006.01)
  *F03B 3/12* (2006.01)
  *F04D 29/30* (2006.01)
  *F04D 29/56* (2006.01)

(52) U.S. Cl.
  CPC ......... *F04D 29/305* (2013.01); *F04D 29/563* (2013.01); *B64D 27/10* (2013.01); *F05D 2220/323* (2013.01)

(56) References Cited

U.S. PATENT DOCUMENTS

| | | | |
|---|---|---|---|
| 4,495,423 A | 1/1985 | Rogers | |
| 4,514,141 A * | 4/1985 | Marey | F01D 17/162 415/160 |
| 4,604,030 A * | 8/1986 | Naudet | F01D 11/001 415/126 |
| 4,743,163 A | 5/1988 | Markunas et al. | |
| 4,884,948 A * | 12/1989 | Sikorski | B64C 11/26 416/240 |
| 5,458,465 A * | 10/1995 | von Wieser | F04D 29/38 416/214 R |
| 5,562,417 A | 10/1996 | Grimm et al. | |
| 5,796,199 A * | 8/1998 | Charbonnel | F01D 17/162 310/90 |
| 6,129,512 A * | 10/2000 | Agram | F01D 17/162 415/229 |
| 11,384,649 B1 * | 7/2022 | Rambo | F01D 9/02 |
| 2001/0016091 A1 * | 8/2001 | Mesing | F04D 29/023 384/300 |
| 2004/0081554 A1 * | 4/2004 | Bruce | F04D 29/563 415/229 |
| 2006/0263220 A1 | 11/2006 | Russ | |
| 2009/0274547 A1 * | 11/2009 | Jahns | F04D 23/006 415/60 |
| 2014/0119895 A1 * | 5/2014 | Lockyer | F04D 29/563 415/208.1 |
| 2015/0017000 A1 * | 1/2015 | Sato | F16C 17/10 416/174 |
| 2016/0298457 A1 * | 10/2016 | Edwards | F01D 5/10 |
| 2018/0127084 A1 * | 5/2018 | Tajan | F01D 7/00 |
| 2018/0335046 A1 | 11/2018 | Charier et al. | |
| 2020/0018181 A1 | 1/2020 | Brault et al. | |
| 2021/0108597 A1 * | 4/2021 | Ostdiek | F02C 6/206 |
| 2023/0079110 A1 * | 3/2023 | Lima | F01D 9/041 415/121.3 |
| 2023/0271695 A1 * | 8/2023 | Charier | F01D 25/04 244/69 |
| 2023/0358149 A1 * | 11/2023 | Levisse | F01D 17/162 |
| 2023/0366325 A1 * | 11/2023 | Levisse | F01D 7/00 |
| 2024/0151153 A1 * | 5/2024 | Guiot | F04D 29/563 |

OTHER PUBLICATIONS

KVT_PEM_Selfclinching_fastenersEN_Jun. 2016_web; 2016; KVT Fastening. https://www.kvt-fastening.at/-/media/kvt/download-center/catalogs/kataloge_en/kvt_pem_selfclinching_fastenersen_06-2016_web.pdf (Year: 2016).*
International Search Report (with English translation) mailed Aug. 8, 2022, issued in corresponding International Application No. PCT/FR2022/051113, filed Jun. 13, 2022, 5 pages total.
Written Opinion (with English translation) mailed Aug. 8, 2022, issued in corresponding International Application No. PCT/FR2022/051113, filed Jun. 13, 2022, 12 pages total.
Non-Final Office Action mailed Mar. 4, 2025, issued in corresponding U.S. Appl. No. 18/574, 144, filed Dec. 26, 2023, 18 pages.

* cited by examiner

UNDUCTED RECTIFIER FOR A TURBOMACHINE, TURBOMACHINE MODULE AND AIRCRAFT TURBOMACHINE

CROSS-REFERENCE TO RELATED APPLICATIONS

This application is a National Stage of International Application No. PCT/FR2022/051113, filed Jun. 13, 2022, which claims priority to French Patent Application No. 2106330, filed Jun. 15, 2021, the entire disclosures of which are hereby incorporated by reference in their entirety for all purposes.

DESCRIPTION

Technical Field

This invention relates to the field of turbomachines, and in particular to an unducted turbomachine flow straightener equipped with stator vanes with variable pitch, each attached to a pivot. The invention also relates to a turbomachine module comprising an unducted propeller and such an unducted flow straightener.

Technical Background

The technical background comprises in particular the documents FR 3 082 230 A1, U.S. Pat. No. 4,884,948 A, FR 3 087 831 A1 and FR 3 087 830 A1.

Turbomachines comprising at least one unducted propeller are known as "open rotor" or "unducted fan". In this category of turbomachine, there are those with two unducted and counter-rotating propellers (UDF, for Unducted Fan) or those with a single unducted propeller and a flow straightener comprising several stator vanes (USF, Unducted Single Fan). The propeller or the propellers forming the propulsion portion may be placed at the rear of the gas generator (or engine) so as to be of the pusher type or at the front of the gas generator so as to be of the tractor type. These turbomachines are turboprop engines that differ from turbojet engines by the use of a propeller outside the nacelle (unducted) instead of an internal fan. This allows to increase the bypass ratio very significantly without being penalized by the mass of the casings or nacelles intended to surround the blades of the propeller or fan.

The stator vanes of the flow straightener are generally installed on an inlet casing which carries the splitter nose for separating the primary and secondary flows circulating respectively in a primary duct and around the inlet casing. Unlike the upstream propeller of a USF-type turbomachine, the stator vanes of the flow straightener are stationary in rotation and therefore not subject to centrifugal force.

The stator vanes extend from the inlet casing and are advantageously of variable pitch. To this end, each stator vane root is pivotally mounted along a pitch axis and connected to a pitch change system mounted in the turbomachine. The integration area of the root and of the pivot of the stator vane is a highly constrained area due to the presence of numerous items of equipment around them.

In addition, in such turbomachines where weight savings are sought, the stator vanes are preferably made from a fibre-reinforced polymer matrix composite material, for example obtained from a three-dimensional woven preform. The root of the vane comprises a platform formed by two half-platforms obtained by unbinding the 3D woven preform and each connected to the blade over the entire width of the blade.

The current propeller attachment technologies do not meet the need to attach the stator vanes of a USF-type turbomachine, as they are both radially or tangentially bulky and designed to withstand high centrifugal forces. It is therefore necessary to have a technology that meets the exact requirements of the stator vanes of an unducted flow straightener for a USF type turbomachine.

Given these observations, one of the aims of the invention is to overcome the above-mentioned disadvantages.

SUMMARY OF THE INVENTION

The aim of the present invention is to provide an unducted flow straightener equipped with stator vanes attached on pivots in the most radially compact way possible and adapting as well as possible to the geometry of the pivots and of the stator vanes in order to limit as much as possible the tangential and axial impact of the latter on the environment.

To this end, the invention relates to an unducted turbomachine flow straightener of longitudinal axis X, the flow straightener comprising:
 a plurality of stator vanes extending substantially along a radial axis Z, each stator vane comprising a root and a blade rising radially from the root, the root comprising two half-platforms extending on either side of the blade,
 a plurality of pivots, each associated with a stator vane and pivotally mounted along a pitch axis intended to be connected to a pitch change system for changing the pitch of the blades, each pivot comprising an upper platform and a cylindrical lower portion,
 a plurality of attachment systems, each associated with a stator vane and being adapted to attach the half-platforms of the vane root to the associated pivot, each attachment system comprising a clamping system and two plates arranged on either side of the blade, each of the plates having a shape substantially identical to each half-platform, the clamping system being shaped to clamp the half-platforms of the root of the vane between the plates of the attachment system and the upper platform of the pivot.

Thus, this solution allows to achieve the above-mentioned objective. In particular, the invention allows to attach each unducted stator vane to its pivot by clamping the half-platforms of the latter (resulting from an unbinding in the weaving of the fibres of the vanes) by means of two parts having a shape that matches both the shape of the pivot and the shape of the stator vane.

The advantage of this solution is that it takes up less radial overall dimension, thereby increasing the space available under the duct. The plates of the attachment system are adapted to the shape of the root of the vane and the shape of its pivot without taking up more space than that provided for these elements.

In addition, the plates allow to prevent a direct contact between a clamping system, such as screws, and the half-platforms resulting from an unbinding in the weaving of the fibres of the vanes.

It also allows to protect the half-platforms of the stator vanes formed by an unbinding from external damage.

Thanks to the invention, it is possible to easily dismantle the underwing blading without dismantling any other portion of the engine and without having to access under the nacelle duct.

The unducted flow straightener according to the invention may comprise one or more of the following characteristics, taken in isolation from each other or in combination with each other:

- for each assembly formed by a stator vane, an associated pivot and an associated attachment system, each half-platform is connected to the blade of the vane by a connection fillet, each upper platform of the pivot is circular in shape and each lower portion of the pivot has a diameter smaller than that of the upper platform, each plate of the attachment system is substantially half-moon-shaped comprising a lateral edge shaped to match the connection fillet of the half-platform against which the plate is clamped;
- each half-platform is substantially flat;
- each half-platform is substantially in the shape of a half-disc;
- each lateral edge of a plate of an attachment system comprises a gasket arranged along the entire length of the lateral edge and shaped to match the connection fillet of the half-platform against which the plate is clamped;
- each half-platform of a root of a vane comprises at least two through-orifices, each upper platform of a pivot associated with a root of the vane comprises through-holes each arranged opposite a through-orifice of a half-platform, each plate of an attachment system associated with a root of the vanes comprises through-holes each arranged opposite a through-orifice of a half-platform;
- the clamping system comprises at least four screws and four rotation-stop means arranged to clamp the half-platforms of the root of the vane between the plates of the attachment system and the upper platform of the pivot, each screw being inserted successively into a through-hole in a plate of the attachment system, an orifice in a half-platform, a through-hole in the pivot and a rotation-stop means;
- each through-hole in an upper platform comprises a self-locking insert to prevent the rotation of a screw inserted into the through-hole;
- each rotation-stop means is a nut crimped to prevent its rotation;
- each lower portion of a pivot comprises a body and a segment of larger diameter than the body arranged between the body and the upper platform and wherein each crimped nut of a clamping system comprises a flattened area coming in abutment against the segment of larger diameter;
- each rotation-stop means of a clamping system is a nut trapped in a through hole in an upper platform of a pivot;
- each through-orifice in a half-platform has a metallic insert;
- each half-platform of a root of a vane comprises two dampers arranged on two opposite faces of the half-platform, one of the damper being arranged between the half-platform and a plate and the other of the damper being arranged between the half-platform and the upper platform of the pivot;
- the two half-platforms of the root of the vane are the result of an unbinding in the weaving of the fibres of the vanes.

The invention also relates to a turbomachine module with a longitudinal axis X, comprising:
- an unducted propeller designed to be driven in rotation about the longitudinal axis X,
- at least one unducted flow straightener having any of the preceding characteristics, and
- a pitch change system for changing the pitch of the blades of the stator vanes about a pitch axis A.

The invention further relates to an aircraft turbomachine comprising at least one turbomachine module as previously described.

BRIEF DESCRIPTION OF FIGURES

The invention will be better understood and other details, characteristics and advantages of the present invention will become clearer from the following description made by way of non-limiting example and with reference to the attached drawings, in which.

In the various figures, the similar elements are designated by identical references. In addition, the various elements are not necessarily shown to scale in order to present a view allowing to facilitate the understanding of the invention.

DESCRIPTION OF THE EMBODIMENTS

Figure 1:
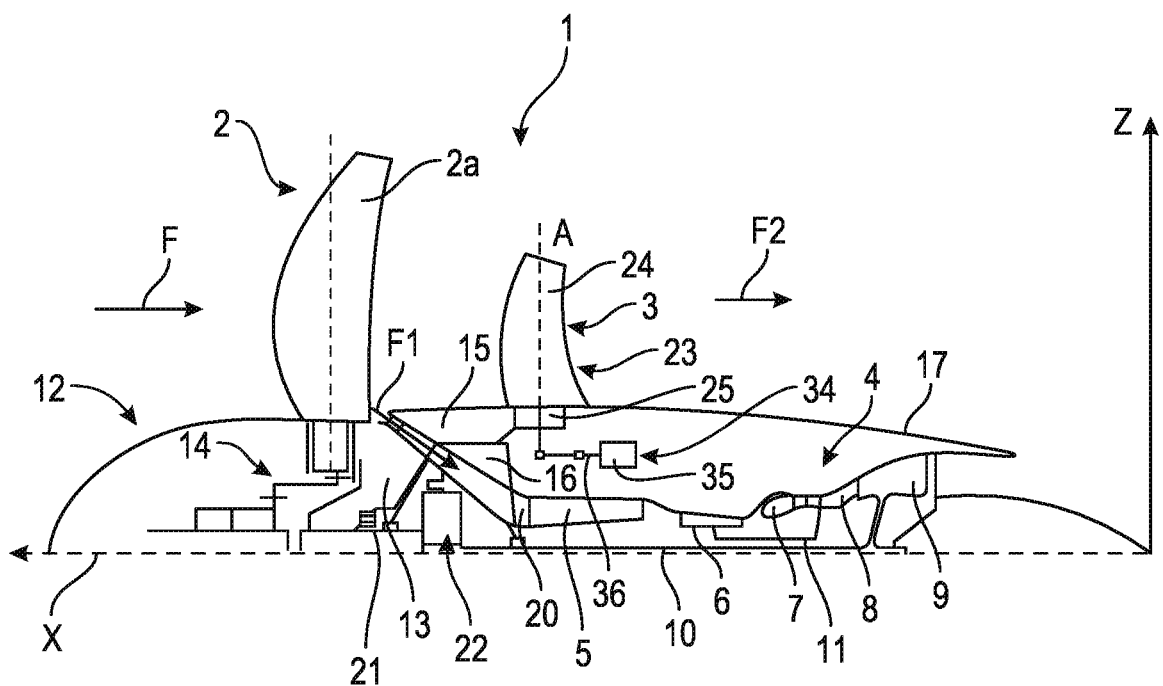
FIG. 1 is a schematic view, in partial axial cross-section, of an example of a turbomachine with a single unducted propeller and an unducted flow straightener to which the invention applies.

The invention applies to a turbomachine 1 comprising a single unducted propeller 2 and an equally unducted flow straightener 3. The turbomachine is intended to be mounted on an aircraft. Such a turbomachine is a turboprop engine as shown in FIG. 1. This turbomachine is referred to as the "Unducted Single Fan" as explained above. The invention is also applicable to other types of turbomachine.

In the present invention, and in general, the terms "upstream", "downstream", "axial" and "axially" are defined with respect to the circulation of the gases in the turbomachine and here along the longitudinal axis X (and even from left to right in FIG. 1). Similarly, the terms "radial", "internal" and "external" are defined with respect to a radial axis Z perpendicular to the longitudinal axis X and with respect to the distance from the longitudinal axis X.

In FIG. 1, the turbomachine 1 comprises a gas generator 4 which typically comprises, from upstream to downstream, a low-pressure compressor 5, a high-pressure compressor 6, a combustion chamber 7, a high-pressure turbine 8 and a low-pressure turbine 9. The low-pressure compressor 5 and the low-pressure turbine 9 are mechanically connected by a low-pressure shaft 10 so as to form a low-pressure body. The high-pressure compressor 6 and the high-pressure turbine 8 are mechanically connected by a high-pressure shaft 11 so as to form a high-pressure body. The low-pressure shaft 10 extends at least partly inside the high-pressure shaft 11 and are coaxial with the longitudinal axis X.

The unducted propeller 2 is formed by a ring of movable blades 2a which extend from a rotary casing 12 which is centred and movable in rotation about the longitudinal axis X. The rotary casing 12 is mounted so that it can move relative to an internal casing 13 that extends downstream of the rotary casing 12. In the example shown in FIG. 1, the propeller 2 is mounted upstream of the gas generator 4 (puller configuration). Alternatively, the propeller 2 is mounted downstream of the gas generator 4 (pusher configuration). The blades 2a of the propeller 2 can be variable pitch by means of a pitch change system 14.

An airflow F passing through the turbomachine 1 divides into a primary airflow F1 and a secondary airflow F2 at the level of a splitter nose 15. The latter is carried by an inlet casing 16 centred on the longitudinal axis. The rotary casing 12 is also mounted so that it can move relative to the inlet casing 16. The latter is extended downstream by an external casing or inter-duct casing 17. In particular, the inlet casing 16 comprises a radially internal shell 18 and a radially external shell 19 (visible in FIG. 2) which are centred on the axis X and which partly form the radially internal and external walls respectively of the primary duct 20 in which the primary air flow F1 circulates. A plurality of structural arms 21 extend radially between the radially internal shell 18 and the radially external shell 19.

The power shaft or the low pressure shaft 10 (of the free power turbine and of the low pressure turbine respectively) drives the propeller 2 which compresses the air flow outside the external casing 17 and provides most of the thrust. Optionally, a reducer 22 is interposed between the propeller 2 and the power shaft as shown in FIG. 1. The reducer 22 can be of the planetary gear train or epicyclic gear train type.

Figure 2:
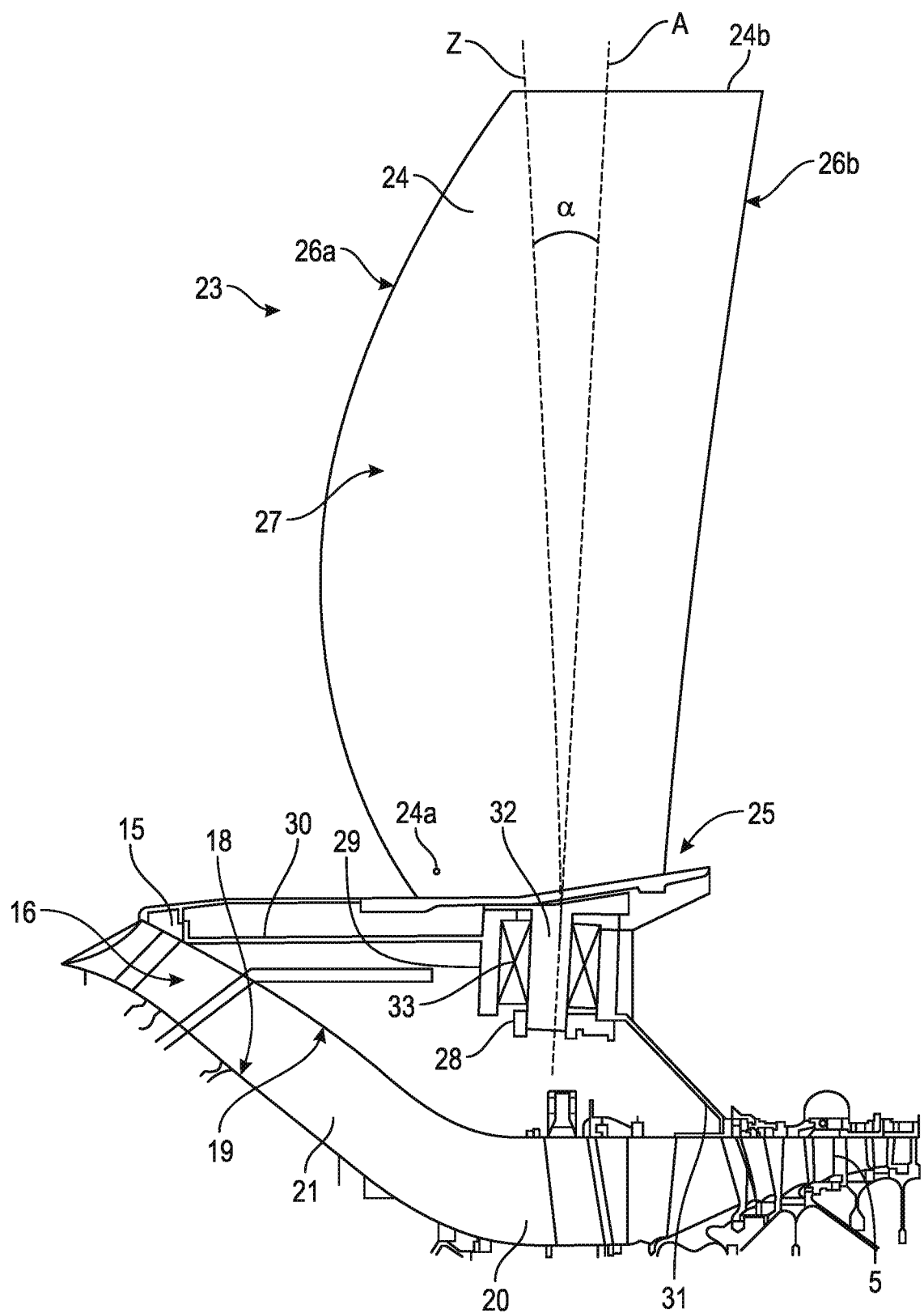
FIG. 2 shows a partial axial cross-section of a flow straightener mounted downstream of a propeller of a turbomachine module to which the invention applies.

With reference to FIGS. 1 and 2, the flow straightener 3 is located downstream of the propeller 2. The flow straightener 3 comprises a plurality of stator vanes 23 (or stationary vanes) referred to as "OGV" for Outlet Guide Vane. The stator vanes 23 are evenly distributed around the longitudinal axis X and extend radially into the secondary air flux F2. The stator vanes 23 of the flow straightener 3 are arranged downstream of the blades 2a of the propeller 2 so as to rectify the airflow generated by the latter.

The various elements described above are assembled and/or manufactured in a modular manner to make them easier to manufacture and maintain.

According to the example, the blades of the stator vanes 23 of this module have a height substantially along the radial axis which is less than that of the blades 2a of the propeller 2. In this way, the stator vanes can rectify the flow created by the upstream propeller 2 while limiting the drag and the mass. For example, the stator vanes 23 have a height along the radial axis of between 30% and 90% of the radial height of the blades of the propeller 2.

With reference to FIG. 2, each stator vane 23 comprises a blade 24 extending radially from a root 25 between a radially internal end 24a and a radially external free end 24b. The blades 24 also each comprise an axially opposite leading edge 26a and trailing edge 26b. The leading and trailing edges 26a, 26b are connected by transversely opposed intrados and extrados surfaces 27 (A, B). For example, there are between six and twelve stator vanes 23 around the inlet casing 16.

Advantageously, the stator vanes 23 have variable pitch so as to optimise the performance of the turbomachine. A second pitch change system 34 (visible in FIG. 1) which is mounted in the turbomachine, and in particular in the external casing 17, is connected to the blades of the stator vanes 23 so as to allow them to pivot about their pitch axes A. The pitch axis may be the radial axis Z or inclined with respect to the radial axis Z by an angle of less than 45° (as shown in FIG. 2). This inclination is chosen to adapt the aerodynamic effect of the stator vanes 23.

To this end, and as can be seen in FIG. 2, each root 25 of the stator vane 23 is connected to a pivot 32 mounted so as to pivot along the pitch axis A in an internal housing 28 which is formed in a hollow cylindrical static portion 29 forming a sleeve. Each sleeve 29 is cylindrical and extends substantially along the radial axis Z and is rigidly attached to a casing, for example to the inlet casing 16 upstream by a first leg 30 and downstream by a second leg 31.

The pivot 32 of the root 25 is pivotally mounted by means of at least one guide bearing 33 which retains the pivot 32 in the internal housing 28 of each sleeve 29. Two guide bearings can be mounted in the housing 28, in an superimposed manner along the pitch axis A. The bearing or bearings are preferably, but not exclusively, ball bearings.

The pitch change system 34 comprises at least one control means 35 and at least one connecting mechanism 36, which are shown schematically in FIG. 1. The connecting mechanism 36 is connected to each root 25 of vane 24 on the one hand and to the control means 35 on the other. The pivot 32, which passes through the sleeve 29 on either side along the pitch axis A, comprises an internal end with an eccentric which is connected to the end of a connecting rod (not shown) of the connecting mechanism 36. The latter comprises a plurality of connecting rods, one end of each of which is connected to a vane root. The other end of each connecting rod is connected to a movable member of the control means, which may be a hydraulic or pneumatic cylinder.

In such turbomachines, where weight savings are sought, the stator vanes are preferably made from a fibre-reinforced polymer matrix composite material, for example obtained from a three-dimensional woven preform.

Figure 3:
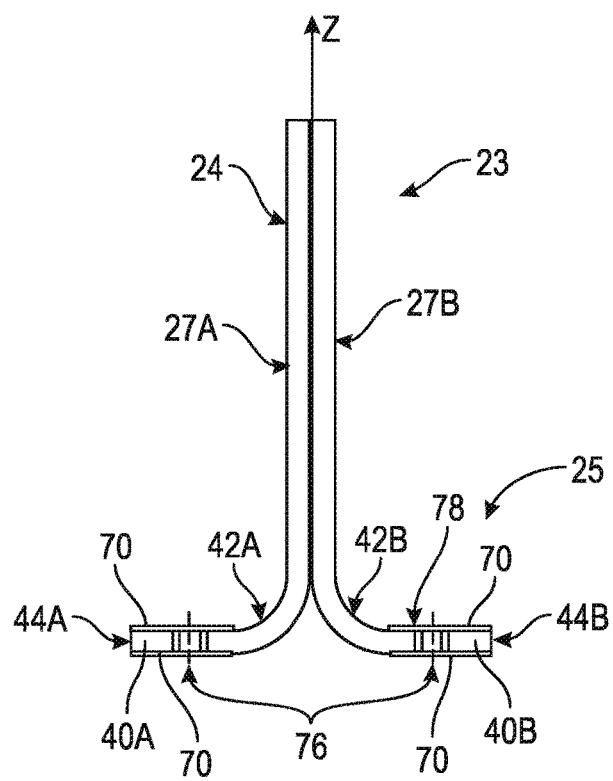
FIG. 3 is a very schematic cross-sectional view of a stator vane of an unducted flow straightener according to the invention.
Figure 4:
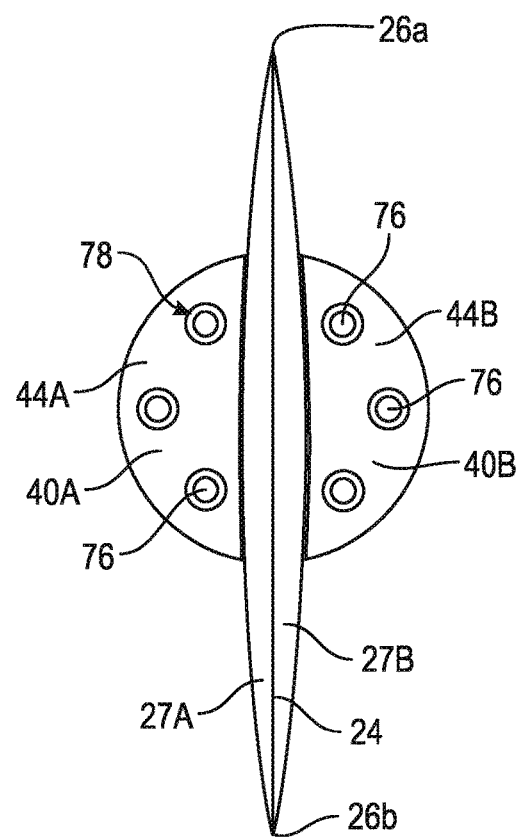
FIG. 4 shows a schematic view of the stator vane in FIG. 3.

With reference to FIGS. 3 and 4, the root 25 of the vane advantageously comprises two half-platforms 40 obtained by unbinding the 3D woven preform and each connected to the blade 24 over at least a segment of the width of the blade (from the leading edge 26a to the trailing edge 26b) by a connection fillet 42. These two half-platforms extend on either side of the blade 24 in a direction substantially perpendicular to the blade 24. The half-platform extending from the intrados 27A of the blade is referred to as the intrados half-platform 40A and the other half-platform extending from the extrados 27B of the blade is referred to as the extrados half-platform 40B.

Preferably, each half-platform 40A, 40B of the root of a vane is substantially flat. Similarly, each half-platform 40A, 40B of the root of a vane is preferably shaped like a half-disc. In other words, the free end 44A, 44B of each half-platform 40A, 40B opposite its end connected to a connection fillet 42A, 42B preferably has a semi-circular lateral edge.

Each stator vane 23 is associated with a pivot 32 to which it is connected at the level of its root by an attachment system. There are as many pivots and attachment systems as there are stator vanes.

Figure 5:
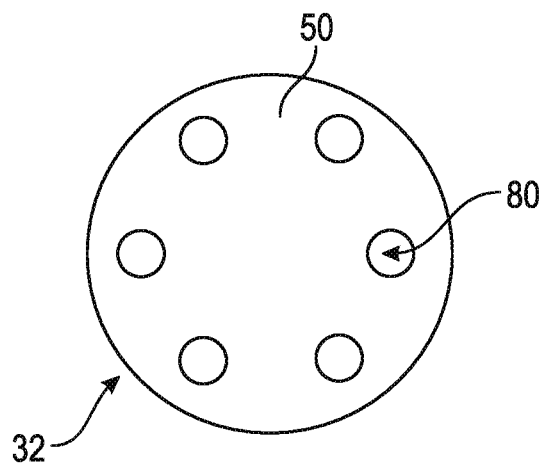
FIG. 5 schematically illustrates a top view of a pivot of an unducted flow straightener according to the invention.
Figure 6:
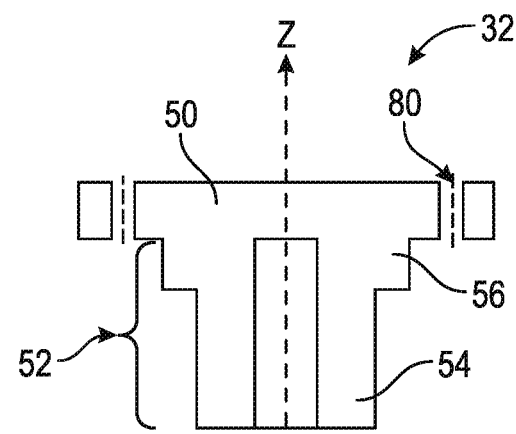
FIG. 6 is a schematic cross-sectional view of the pivot in FIG. 5.
Figure 7:
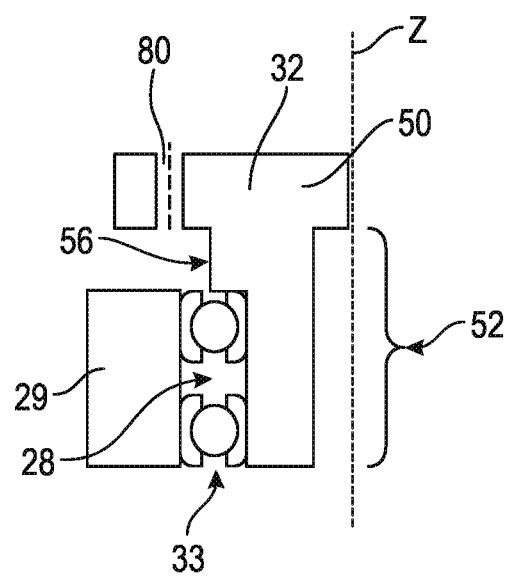
FIG. 7 is a schematic cross-sectional view of the pivot in FIG. 6, which is pivotally mounted by means of a guide bearing in a sleeve.

With reference to FIGS. 5 to 7, each pivot 32 is cylindrical in shape and comprises an upper platform 50 for supporting the two half-platforms 40A, 40B of a root of a vane and a lower portion 52 mounted at least partially in the internal housing 28 formed in the sleeve 29 in a guide bearing 33. The lower portion of the pivot 52 has a smaller diameter than the upper platform 50.

Preferably, the lower portion 52 of the pivot 32 comprises a cylindrical body 54 and an intermediate cylindrical segment 56 with a diameter larger than the body 54 but smaller than the diameter of the platform 50 of the pivot. This intermediate segment 56 is arranged between the body 54 and the upper platform 50 of the pivot 32. This intermediate segment 56 comprises a first end connected to the upper platform 50 and a second end connected to the body 54 of the lower portion. This second end comes in abutment on a guide bearing 33 which retains the pivot 32 in the internal housing 28 of each sleeve 29. Only the body 54 of the lower portion 52 of the pivot 32 is inserted into the housing 28.

Preferably, the upper platform 50 of the pivot 32 is similar in shape to the assembly formed by the two half-platforms 40A, 40B of the root 25 of the vane 23, i.e. circular in shape.

Each attachment system for attaching a root 25 of a vane to a pivot 32 is adapted to attach the half-platforms 40A, 40B of the root of the vane to the associated pivot 32. To this end, each attachment system comprises a clamping system 60 and two plates 62A, 62B arranged on either side of the blade 24.

The clamping system is designed to clamp the half-platforms (intrados 40A and extrados 40B) of the root of the vane between the plates 62A, 62B of the attachment system and the upper platform 50 of the pivot. In other words, the clamping system is adapted to sandwich the half-platforms 40A, 40B of the root 25 of the vane between the plates 62A, 62B of the attachment system and the upper platform 50 of the pivot. In particular, the intrados half-platform 40A is sandwiched between one of the plates, referred to as the intrados plate 62A, of the attachment system and the upper platform 50 of the pivot 32, while the extrados half-platform 40B is sandwiched between the other of the plates, referred to as the extrados plate 62B, of the attachment system and the same upper platform 50.

Figure 8:
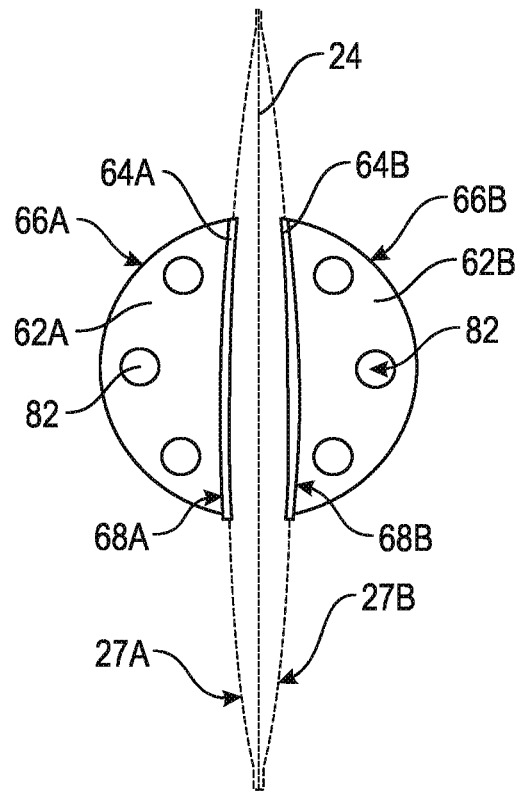
FIG. 8 schematically illustrates a top view of the plates of an attachment system for attaching a stator vane to a pivot the invention.

With reference to FIG. 8, each plate 62A, 62B has a shape and dimensions adapted to each half-platform 40A, 40B, i.e. substantially identical to the half-platform against which it is intended to be clamped. In this way, each plate of the attachment system is substantially half-moon-shaped, comprising a first lateral edge 64A, 64B shaped to match the connection fillet 42A, 42B of the half-platform against which the plate is clamped, and a second lateral edge 66A, 66B of circular shape identical to the lateral edge 44A, 44B of the free end of the half-platform 40A, 40B against which it is intended to be clamped. In other words, the intrados plate 62A has a first lateral edge 64A shaped to fit the extrados side 27A of the profile of the blade at the level of the connection fillet 42A of the intrados half-platform 40A against which the intrados plate is clamped. Similarly, the extrados plate 62B has a first lateral edge 64B shaped to fit the extrados side 27B of the profile of the blade at the level of the connection fillet 42B of the extrados half platform 40B.

Preferably, each first lateral edge 64A, 64B of a plate comprises a gasket 68A, 68B arranged along the entire length of the first lateral edge and shaped to match the profiles (intrados or extrados) of the blade at the level of the connection fillet 42A, 42B of the half-platform 40A, 40B against which the plate is clamped. These gaskets 68A, 68B allow to limit the circulation of the air between the half-platforms 40A, 40B and the plates 62A, 62B of the attachment system and prevent damage to the vane during operation.

Advantageously, the plates 62A, 62B of the attachment system allows that the clamping system does not have to be clamped directly onto the root of the vane, avoiding damage to the vane during assembly and potentially the need to change expensive parts.

In addition, the plates allow to reconstitute the external duct that allow to protect the unbinding of the vane, protecting it from external aggression during operation.

Advantageously, the plates provide a more controlled external surface facing the duct.

Each half-platform 40A, 40B of a root 25 of a vane preferably comprises two dampers 70 visible in FIG. 3 and arranged on two opposite faces of the half-platform. One of the dampers 70 is arranged between the half-platform 40A, 40B and a plate 62A, 62B, while the other of the dampers 70 is arranged between the half-platform 40A, 40B and the upper platform 50 of the pivot 32. The dampers 70 allow to limit friction between the half-platforms of the vane made of composite material and the metallic parts such as the plates of the attachment system and the elements of the pivot.

Advantageously, the clamping system comprises screws 72, preferably with countersunk heads, and rotation-stop means 74, for example nuts, arranged to clamp the half-platforms 40A, 40B of the root 25 of the vane between the plates 62A, 62B of the attachment system and the upper platform 50 of the pivot in order to bind them together. Such screws 72 and nuts can be seen in FIGS. 9 and 10, which show schematically a stator vane 23 attached to a pivot 32 by an attachment system according to the invention.

For this purpose, and with reference to FIGS. 3 and 4, each half-platform 40A, 40B of a root of a vane comprises at least two through orifices 76 for the passage of screws, preferably three through orifices. Each through orifice 76 extends substantially along a radial axis Z. The through orifices 76 are regularly spaced and arranged in a peripheral area of the half-platform 40A, 40B at a distance from the radial axis Z of the blade comprised between the diameter of the intermediate segment 56 of the lower portion 52 of the pivot and the diameter of the upper platform 50 of the pivot 32.

Each through-orifice 76 in a half-platform advantageously has a metallic insert 78 allowing to protect the composite material of the half-platform of the root of the vane when the screws 72 are fitted or clamped.

Similarly, each upper platform 50 of a pivot is pierced with several through holes 80 for the passage of screws, as shown in FIGS. 5 to 7. Each pivot 32 comprises as many holes 80 as the root 25 of the vane with which it is associated and to which it is intended to be attached. Each upper platform 50 comprises at least four through holes 80, preferably six through holes. In a similar way, the through holes 80 of the pivot are each arranged opposite a through orifice 76 of a half-platform 40A, 40B against which it will be pressed by clamping. Each through hole 80 in the pivot extends substantially along a radial axis Z.

Similarly, each plate 62A, 62B of an attachment system associated with a root 25 of the vane comprises through holes 82 for the passage of screws 72, as shown in FIG. 8. Each plate 62A, 62B comprises as many holes 82 as the half-platform 40A, 40B of the root with which it is associated and to which it is intended to be attached. Thus, each plate 62A, 62B comprises at least two through holes 82, preferably three through holes each arranged opposite a through orifice 76 of the half-platform against which it is clamped. Each through hole 82 in a plate 62A, 62B extends substantially along a radial axis Z.

Figure 9:
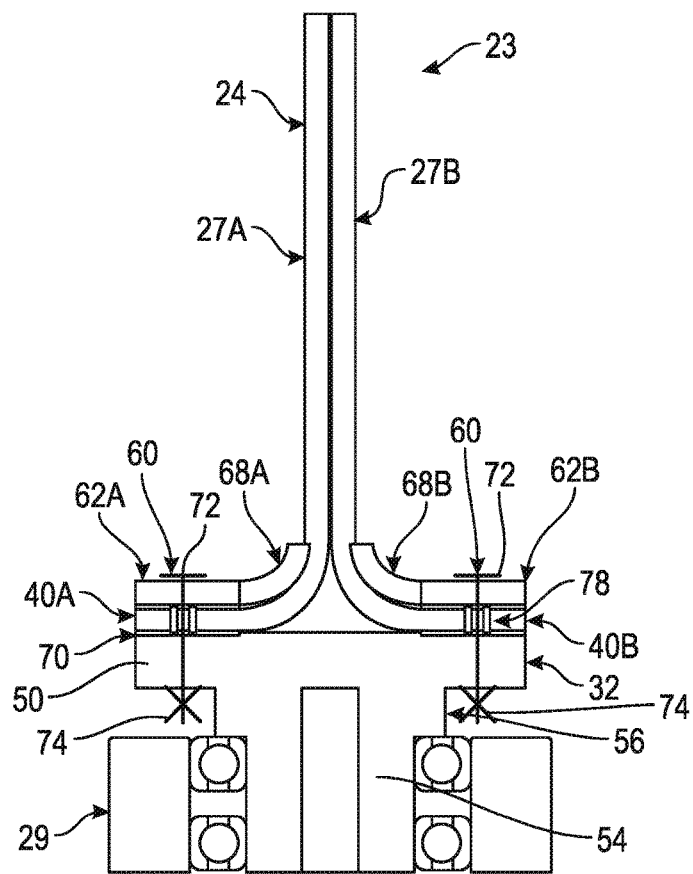
FIG. 9 is a very schematic cross-sectional view of a stator vane connected to a pivot of an unducted flow straightener according to the invention.
Figure 10:
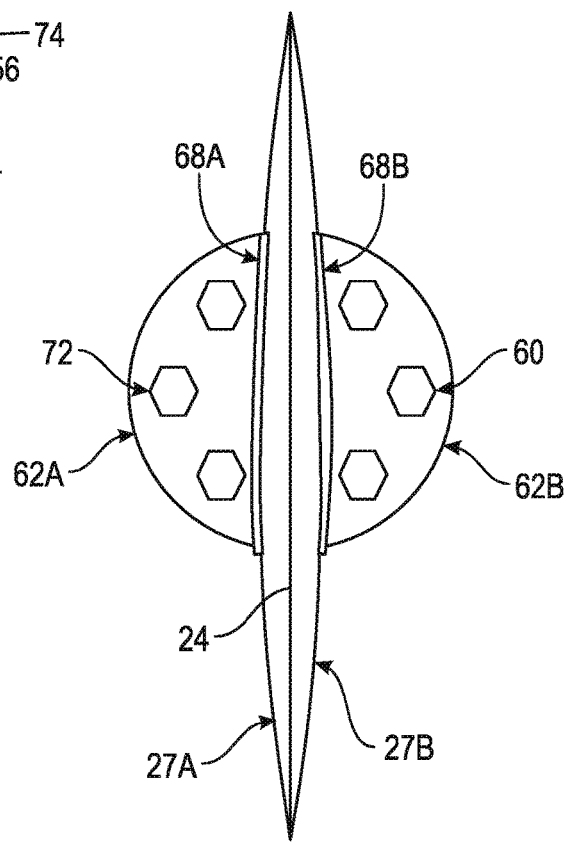
FIG. 10 schematically illustrates a top view of a pivot of the stator vane connected to a pivot in FIG. 9.

Referring to FIG. 9, each screw 72 of the clamping system is inserted successively into a through hole 82 of a plate 62A, 62B of the attachment system, an orifice 76 of a half-platform 40A, 40B, a through hole 80 of the pivot 32 and a rotation-stop means 74.

Preferably, each rotation-stop means 74 is a crimped nut to prevent its rotation. Advantageously, each crimped nut comprises a flattened area which comes in abutment against the intermediate segment 56 of the lower portion 52 of a pivot in order to block the rotation of the nuts.

Alternatively, each rotation-stop means 74 is a nut trapped in a piercing 80 in an upper platform 50 of a pivot 32.

In another alternative, not shown, each through hole 80 in an upper platform 50 of a pivot 32 comprises a self-locking insert to prevent the rotation of the screw inserted into the through hole 80.

The invention, as described above, proposes a compact solution for connecting a stator vane to a pivot, allowing to limit the overall dimension taken up by the hub of the stator vane and to be easily accessible for dismantling/assembling the profile of the stator vane under the wing without having to work on other portions of the engine.

The invention has been described in the context of a turbomachine of the USF type, but it can be applied to any turbomachine comprising unducted vanes that need to be connected to a pivot and whose centrifugal forces are low.

The invention claimed is:

1. An unducted flow straightener for a turbomachine having a longitudinal axis, the flow straightener comprising:
   a plurality of stator vanes extending along a radial axis, each stator vane comprising a root and a blade rising radially from the root, the root having two half-platforms extending on either side of the blade;
   a plurality of pivots, each associated with a stator vane and pivotally mounted along a pitch axis and configured to connect to a pitch change system for changing the pitch of the blades, each pivot having an upper platform and a cylindrical lower portion; and
   a plurality of attachment systems, each associated with a stator vane and being adapted to attach the half-platforms of the root of the vane to the associated pivot, each attachment system comprising a clamping system and two plates arranged on either side of the blade, each of the plates having a shape identical to each half-platform, the clamping system being designed to clamp the half-platforms of the root of the vane between the plates of the attachment system and the upper platform of the pivot,
   wherein each half-platform of a root of a vane has at least two through-orifices, each upper platform of a pivot associated with the root of the vane has through-holes each arranged opposite a through-orifice of a half-platform, and each plate of an attachment system associated with a root of the vane has through holes each arranged opposite a through orifice of a half-platform,
   wherein the clamping system comprises screws and rotation-stop means arranged to clamp the half-platforms of the root of the vane between the plates of the attachment system and the upper platform of the pivot, each screw being inserted successively into a through hole in a plate of the attachment system, an orifice in a half-platform, a through hole in the pivot, and the rotation-stop means,
   wherein each lower portion of a pivot comprises a body and a segment of larger diameter than the body arranged between the body and the upper platform, and
   wherein each rotation-stop means of a clamping system comprises a flattened area coming in abutment against the segment of larger diameter.

2. The flow straightener of claim 1, wherein, for each assembly formed by a stator vane, an associated pivot, and an associated attachment system:
   each half-platform is connected to the blade of the vane by a connection fillet;
   each upper platform of the pivot is circular in shape; and
   each lower portion of the pivot has a diameter smaller than that of the upper platform,
   and wherein each plate of the attachment system is a half-moon-shaped, comprising a lateral edge shaped to match the connection fillet of the half-platform against which the plate is clamped.

3. The flow straightener of claim 2, wherein each lateral edge of a plate of an attachment system has a gasket arranged along the entire length of the lateral edge and shaped to match the connection fillet of the half-platform against which the plate is clamped.

4. The flow straightener of claim 2, wherein each half-platform is flat and/or is half-disc-shaped.

5. The flow straightener of claim 1, wherein
   the clamping system comprises at least four screws and four rotation-stop means arranged to clamp the half-platforms of the root of the vane between the plates of the attachment system and the upper platform of the pivot, each screw being inserted successively into a through hole in a plate of the attachment system, an orifice in a half-platform, a through hole in the pivot, and the rotation-stop means.

6. The flow straightener of claim 1, wherein each rotation-stop means is a nut crimped to prevent its rotation.

7. The flow straightener of claim 1, wherein each rotation-stop means of a clamping system is a nut trapped in a through hole of an upper platform of a pivot.

8. The flow straightener of claim 1, wherein each through-orifice of a half-platform has a metallic insert.

9. The flow straightener of claim 1, wherein each half-platform of a root of a vane has two dampers arranged on two opposite faces of the half-platform, one of the dampers being arranged between the half-platform and a plate and the other of the dampers being arranged between the half-platform and the upper platform of the pivot.

10. The flow straightener of claim 1, wherein the vanes are made of a composite material with a fiber-reinforced polymer matrix, and the two half-platforms of the root of the vane are produced by an unbinding in the weaving of the fibers of the vanes.

11. A turbomachine module with a longitudinal axis, the turbomachine module comprising:
   an unducted propeller designed to be driven in rotation about the longitudinal axis;

at least one unducted flow straightener according to claim 1; and a pitch change system for changing the pitch of the blades of the stator vanes about a pitch axis.

12. An aircraft turbomachine comprising at least one turbomachine module according to claim 11.

13. The flow straightener of claim 1, wherein the upper platform of each pivot is shaped like a disc.

* * * * *